US011383844B1

(12) United States Patent
Moe et al.

(10) Patent No.: US 11,383,844 B1
(45) Date of Patent: *Jul. 12, 2022

(54) STOWABLE AUXILIARY COMPARTMENT PANEL SYSTEM

(71) Applicant: B/E Aerospace, Inc., Winston-Salem, NC (US)

(72) Inventors: Daniel N. Moe, Mukilteo, WA (US); Travis J. Vaninetti, Bothell, WA (US)

(73) Assignee: B/E Aerospace, Inc., Winston-Salem, NC (US)

( * ) Notice: Subject to any disclaimer, the term of this patent is extended or adjusted under 35 U.S.C. 154(b) by 61 days.

This patent is subject to a terminal disclaimer.

(21) Appl. No.: 16/774,692

(22) Filed: Jan. 28, 2020

Related U.S. Application Data

(63) Continuation of application No. 16/748,178, filed on Jan. 21, 2020.

(51) Int. Cl.
*B64D 11/06* (2006.01)

(52) U.S. Cl.
CPC ...... *B64D 11/0639* (2014.12); *B64D 11/0691* (2014.12)

(58) Field of Classification Search
CPC ............ B64D 11/0639; B64D 11/0691; B64D 11/064; B64D 11/0696; B64D 11/0698; B64D 11/04
See application file for complete search history.

(56) References Cited

U.S. PATENT DOCUMENTS

| | | | |
|---|---|---|---|
| 8,387,916 B2 | 3/2013 | Baatz et al. | |
| 9,145,208 B2 | 9/2015 | Hacker et al. | |
| 9,227,728 B2 | 1/2016 | Schimanowski et al. | |
| 9,463,887 B2 | 10/2016 | Ulbrich-Gasparevic et al. | |
| 9,511,867 B2* | 12/2016 | Schliwa ............. | B64D 11/0691 |
| 9,573,689 B2* | 2/2017 | Schliwa ................. | B64D 11/02 |
| 9,611,042 B1* | 4/2017 | Childress ................ | E05F 15/40 |
| 9,682,780 B2* | 6/2017 | Boenning .............. | B64D 11/06 |
| 10,351,244 B2 | 7/2019 | Cooke et al. | |
| 2005/0133388 A1 | 6/2005 | Reysa et al. | |
| 2012/0199695 A1* | 8/2012 | Isherwood ......... | B64D 11/0691 244/118.6 |
| 2013/0206905 A1 | 8/2013 | Savian et al. | |
| 2014/0125092 A1 | 5/2014 | Schreuder et al. | |
| 2015/0115100 A1 | 4/2015 | Schliwa et al. | |
| 2017/0106983 A1* | 4/2017 | Castanos ............ | B64D 11/0691 |

(Continued)

FOREIGN PATENT DOCUMENTS

EP 2759447 A3 8/2014
WO 2018184995 A1 10/2018

*Primary Examiner* — Assres H Woldemaryam
(74) *Attorney, Agent, or Firm* — Suiter Swantz pc llo

(57) ABSTRACT

A stowable auxiliary compartment panel system may include an auxiliary compartment panel, an actuation assembly, and a latch assembly. The auxiliary compartment panel may be configured to transition between a stowed position and a deployed position via the actuation assembly. The auxiliary compartment panel may be configured to secure to the monument via the latch assembly when the auxiliary compartment panel is in the deployed position. An auxiliary compartment defined within the monument may be accessible when the auxiliary compartment panel is in the stowed position. The stowable auxiliary compartment panel system may be installed within an aircraft cabin.

11 Claims, 18 Drawing Sheets

(56) References Cited

U.S. PATENT DOCUMENTS

| | | |
|---|---|---|
| 2017/0341750 A1 | 11/2017 | Gonnsen et al. |
| 2017/0341753 A1* | 11/2017 | Gonnsen .................. A47C 1/00 |
| 2018/0057169 A1* | 3/2018 | Phi ........................ B60N 2/305 |
| 2018/0148178 A1* | 5/2018 | Koehler ............. B64D 11/0691 |
| 2018/0346090 A1 | 12/2018 | Heidtmann et al. |
| 2019/0111810 A1* | 4/2019 | Hoover .................... B60N 2/20 |
| 2019/0126852 A1 | 5/2019 | Hupperich et al. |
| 2019/0331943 A1 | 10/2019 | Hupperich et al. |

* cited by examiner

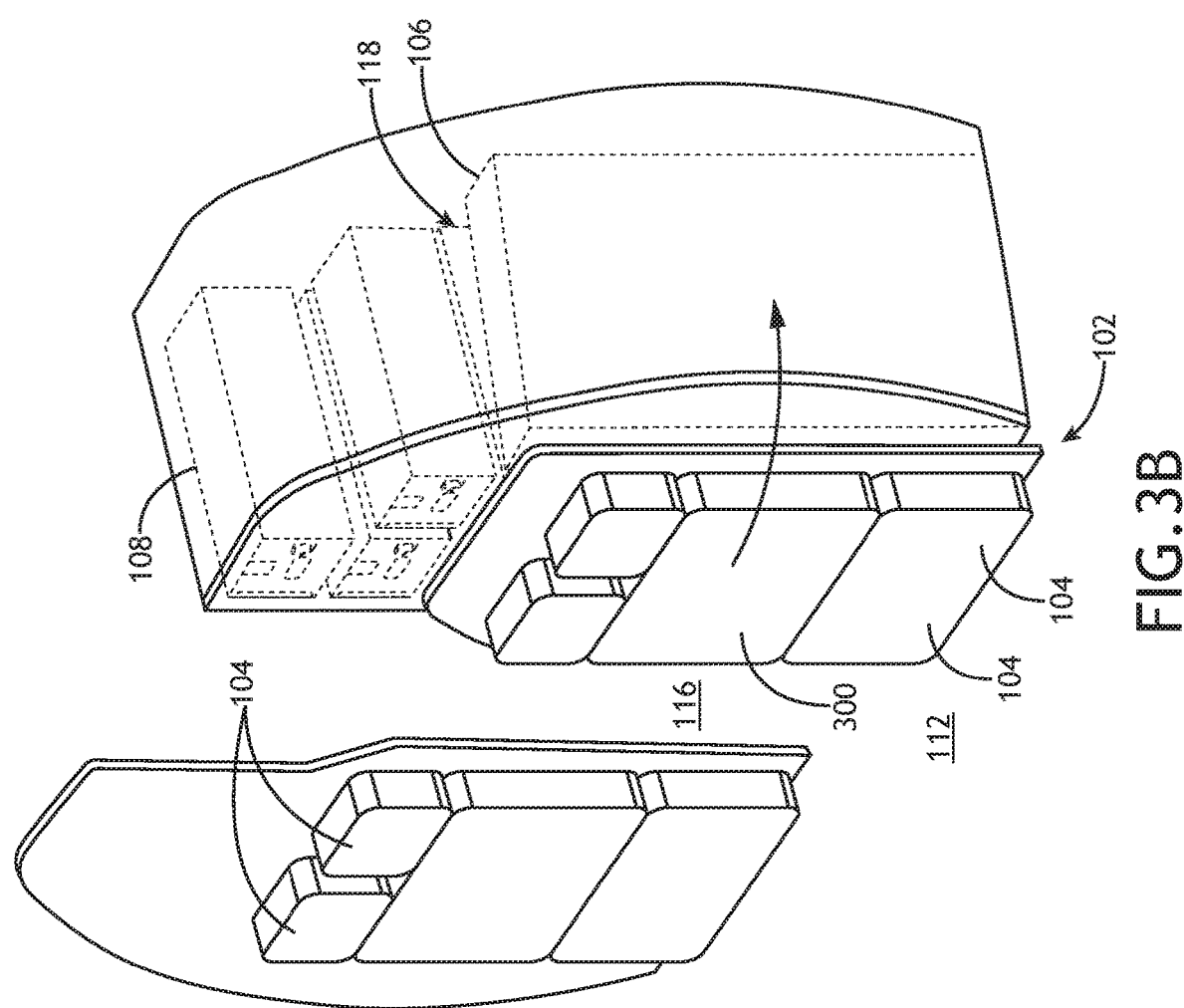

STOWABLE AUXILIARY COMPARTMENT PANEL SYSTEM

CROSS-REFERENCE TO RELATED APPLICATIONS

The present application is a continuation of U.S. patent application Ser. No. 16/748,178, filed Jan. 21, 2020, titled STOWABLE FLIGHT ATTENDANT SEAT SYSTEM, naming Daniel N. Moe and Travis J. Vaninetti as inventors, incorporated herein by reference in the entirety.

BACKGROUND

Aircraft cabin designs include flight attendant seats for taxi, takeoff, or landing (TTOL) situations, turbulence, emergencies, or the like. However, the aircraft cabin designs need to address competing interests for increased passenger seating, storage space, lavatories, and/or galley spaces in addition to the need for the flight attendant seats.

SUMMARY

A stowable auxiliary compartment panel system is disclosed, in accordance with one or more embodiments of the disclosure. The system may include an auxiliary compartment panel. The system may include an actuation assembly. The actuation assembly may be configured to transition the auxiliary compartment panel between a stowed position and a deployed position. The system may include a latch assembly. The latch assembly may be configured to secure the auxiliary compartment panel to a monument proximate to the auxiliary compartment panel when the auxiliary compartment panel is in the deployed position. An auxiliary compartment defined within the monument may be accessible when the auxiliary compartment panel is in the stowed position. The stowable auxiliary compartment panel system may be installed within an aircraft cabin.

An aircraft cabin is disclosed, in accordance with one or more embodiments of the disclosure. The aircraft cabin may include a monument. The aircraft cabin may include a stowable auxiliary compartment panel system positioned proximate to the monument. The system may include an auxiliary compartment panel. The system may include an actuation assembly. The actuation assembly may be configured to transition the auxiliary compartment panel between a stowed position and a deployed position. The system may include a latch assembly. The latch assembly may be configured to secure the auxiliary compartment panel to the monument when the auxiliary compartment panel is in the deployed position. An auxiliary compartment defined within the monument may be accessible when the auxiliary compartment panel is in the stowed position.

In some embodiments, the auxiliary compartment panel may be configured to stow within an aircraft cheek. The aircraft cheek may be defined at least in part by a sidewall of the monument and a sidewall of an aircraft fuselage including the aircraft cabin.

In some embodiments, the auxiliary compartment panel may be configured to rotate about a first axis and then translate along a second axis when transitioning between the deployed position and the stowed position in the aircraft cheek.

In some embodiments, the auxiliary compartment panel may be configured to translate along the second axis parallel to a door bustle within a galley section of the aircraft cabin.

In some embodiments, the auxiliary compartment panel may be configured to stow proximate to an exterior surface of the monument within an aisle of the aircraft cabin.

In some embodiments, the auxiliary compartment panel may be configured to rotate about a first axis and then translate along a second axis when transitioning between the deployed position and the stowed position proximate to the exterior surface of the monument.

In some embodiments, the auxiliary compartment panel may be configured to translate along the second axis parallel to the exterior surface of the monument.

In some embodiments, the system may further include at least one flight attendant seat. The at least one flight attendant seat may include a seat pan. The seat pan may be configured to actuate between a folded position and an open position. The at least one flight attendant seat may be coupled to the auxiliary compartment panel. The seat pan may be in the folded position when the auxiliary compartment panel is in the stowed position.

In some embodiments, the auxiliary compartment may be accessible from a galley section of the aircraft cabin when the auxiliary compartment panel is in the stowed position.

In some embodiments, the auxiliary compartment may be configured to stow one or more galley carts.

In some embodiments, the auxiliary compartment may include one or more galley inserts.

In some embodiments, the auxiliary compartment may be configured to stow equipment including emergency equipment, auxiliary aircraft accessories, crew member luggage, or oversized passenger luggage.

In some embodiments, the auxiliary compartment may include a worktable area.

In some embodiments, the auxiliary compartment may include one or more fixtures.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 3B illustrates a perspective view of an aircraft cabin including a stowable auxiliary compartment panel system, in accordance with one or more embodiments of the disclosure;

DETAILED DESCRIPTION OF THE INVENTION

Figure 1:
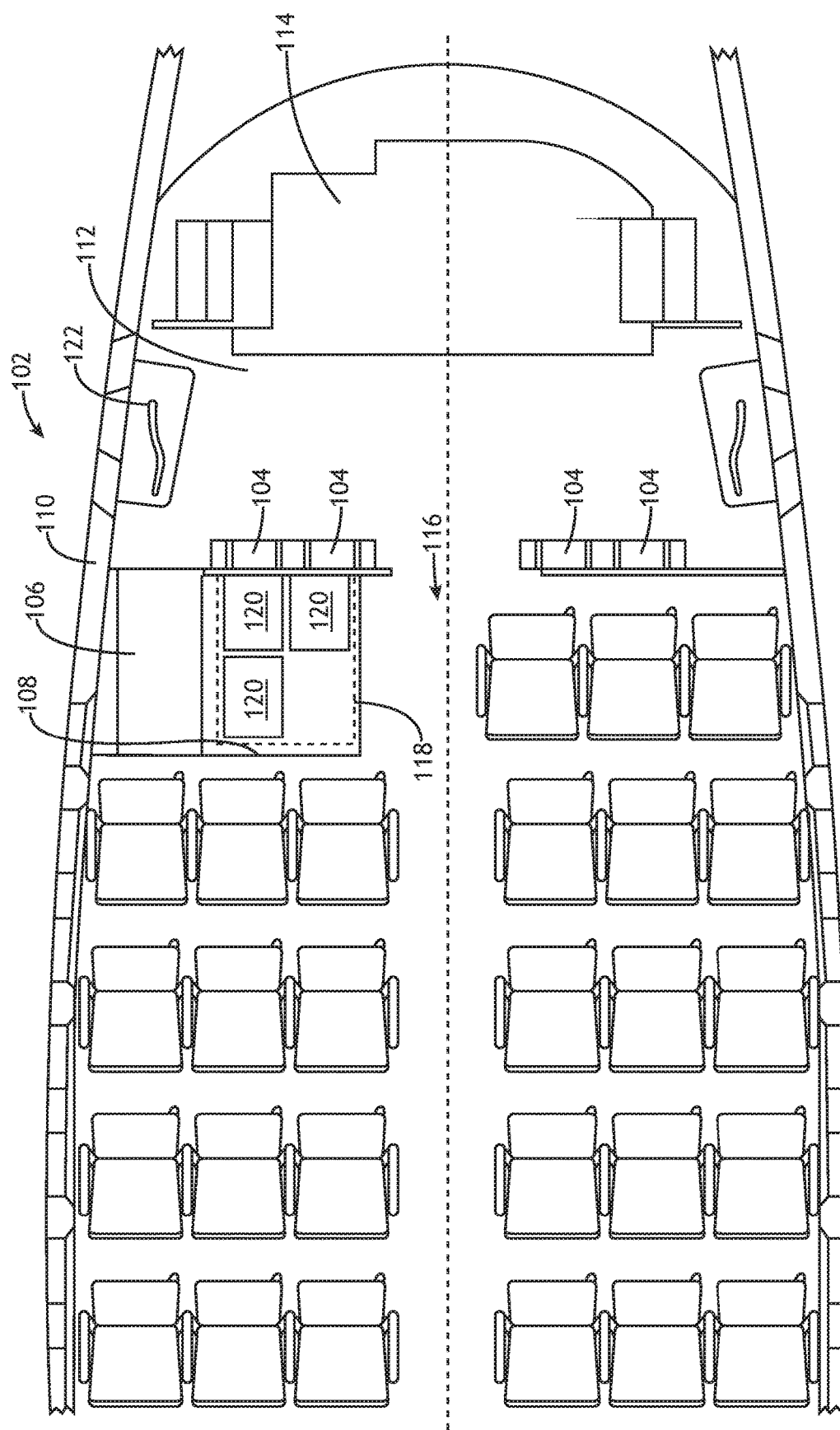
FIG. 1 illustrates a plan view of an aircraft cabin including a stowable auxiliary compartment panel system, in accordance with one or more embodiments of the disclosure.

Reference will now be made in detail to the subject matter disclosed, which is illustrated in the accompanying drawings.

Before explaining one or more embodiments of the disclosure in detail, it is to be understood the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

FIGS. 1-6 generally illustrate a stowable auxiliary compartment panel system, in accordance with one or more embodiments of the disclosure.

Aircraft cabin designs include flight attendant seats for taxi, takeoff, or landing (TTOL) situations, turbulence, emergencies, or the like, as aviation guidelines and/or standards dictate that flight attendants be seated at these times.

However, the aircraft cabin designs need to address competing interests for increased passenger seating, storage space, lavatories, and/or galley spaces in addition to the need for the flight attendant seats. Arranging aircraft cabins may require minimizing an amount of room used for storage space, lavatories, galley spaces, and the flight attendant seats in order to increase passenger seating. This minimizing may include modifying the arrangement and/or design of components including, but not limited to, a galley, an aircraft lavatory, seating for attendants, or other structures and/or monuments of the aircraft passenger cabin.

For example, select aircraft cabin designs may trade more passenger seats for a combination auxiliary galley and lavatory monument. It is noted herein, however, that such trade-offs may condense foot traffic to a particular portion of the aircraft cabin, resulting in a more congested area for flight attendants and passengers alike. By way of another example, select aircraft cabin designs may trade a larger galley and lavatories for fewer passenger seats.

When modifying attendant seating to allow for a more compact arrangement, load-bearing/weight-bearing requirements must be met without losing the intended functionality of the attendant seating. For example, the attendant seating may need to be configured in accordance with aviation guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), or any other standards setting organization or company; the Radio Technical Commission for Aeronautics (RTCA) or any other guidelines agency or organization; or the like.

As such, it would be beneficial to provide a stowable auxiliary compartment panel system that allows for increased passenger seats, storage space, lavatories, and/or galley spaces, while reducing the possibility of congestion in the auxiliary space and meeting aviation guidelines and/or standards.

FIGS. 1-4E generally illustrate a stowable auxiliary compartment panel system 102 within an aircraft cabin 100, in accordance with one or more embodiments of the disclosure.

Figure 2A:
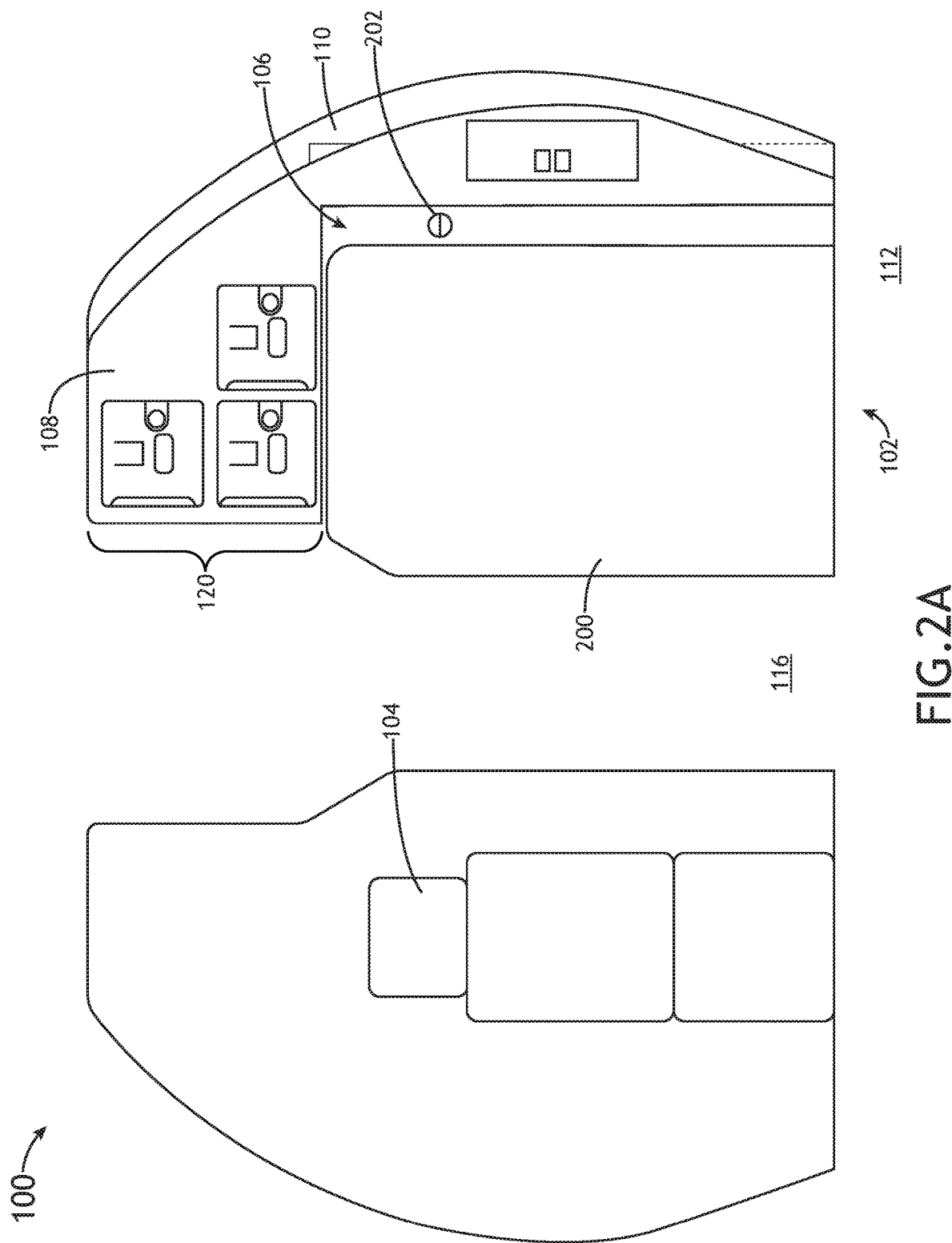
FIG. 2A illustrates an elevation view of an aircraft cabin including a stowable auxiliary compartment panel system, in accordance with one or more embodiments of the disclosure.
Figure 2B:
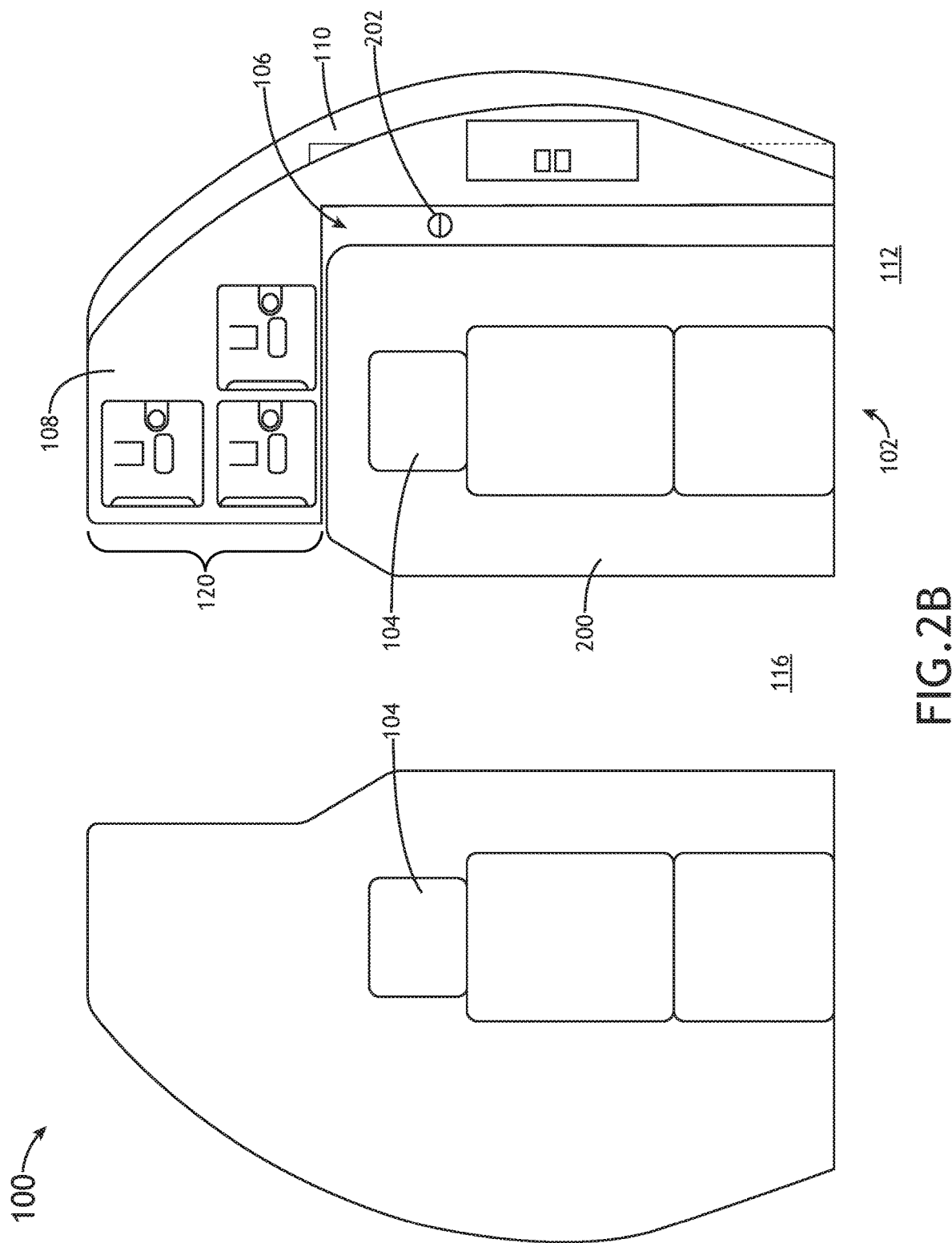
FIG. 2B illustrates an elevation view of an aircraft cabin including a stowable auxiliary compartment panel system, in accordance with one or more embodiments of the disclosure.
Figure 2C:
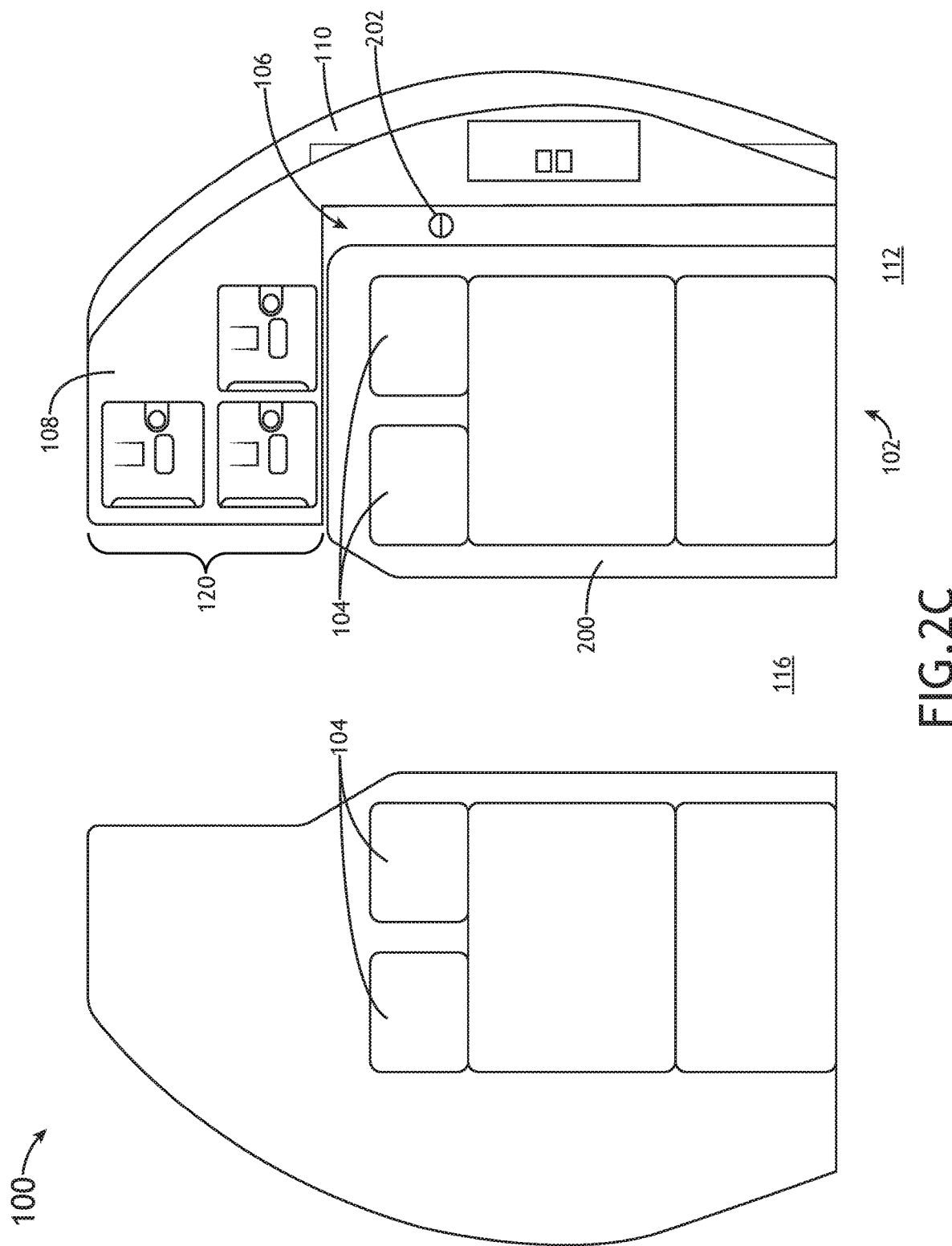
FIG. 2C illustrates an elevation view of an aircraft cabin including a stowable auxiliary compartment panel system, in accordance with one or more embodiments of the disclosure.
Figure 2D:
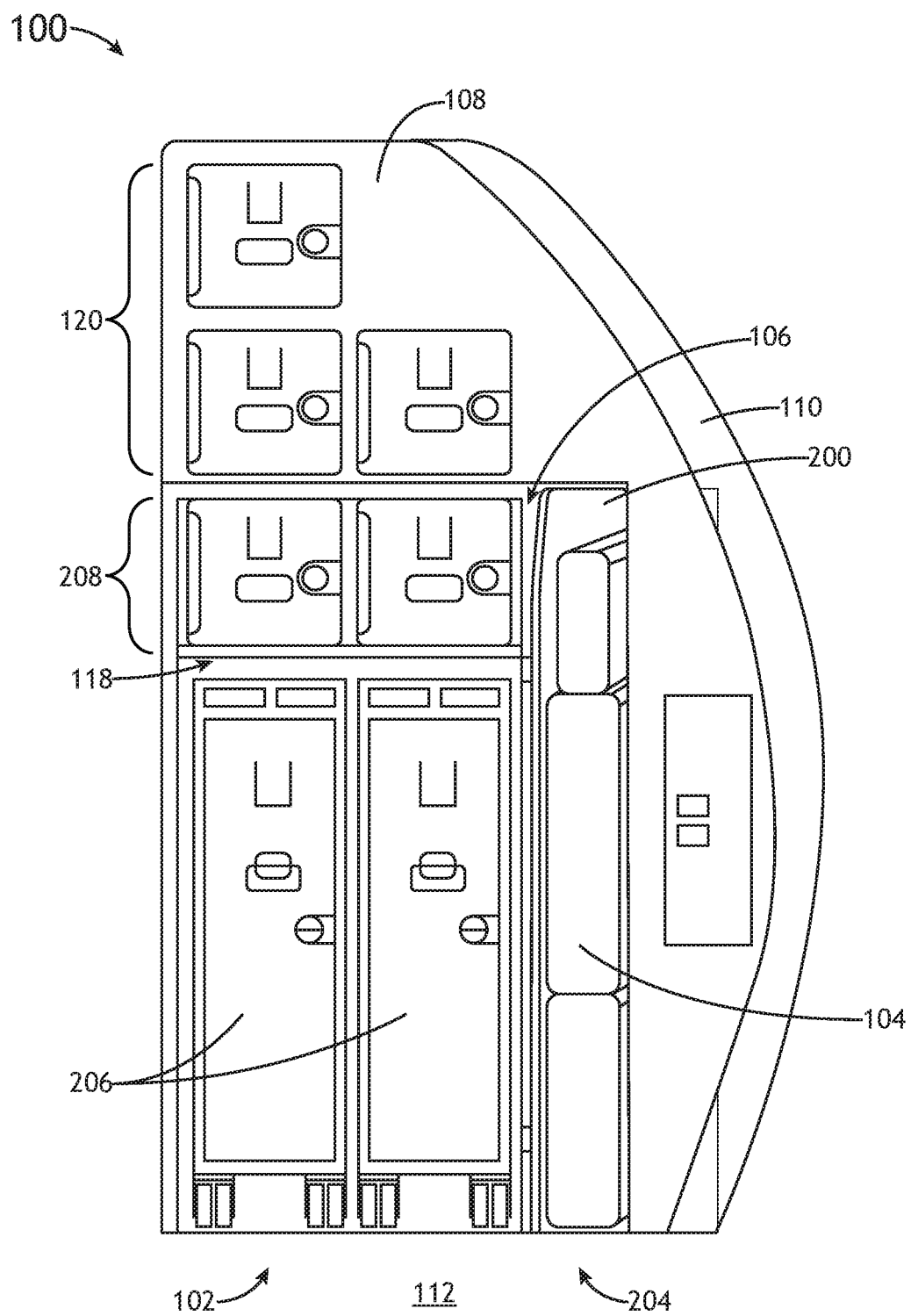
FIG. 2D illustrates an elevation view of an aircraft cabin including a stowable auxiliary compartment panel system, in accordance with one or more embodiments of the disclosure.
Figure 2E:
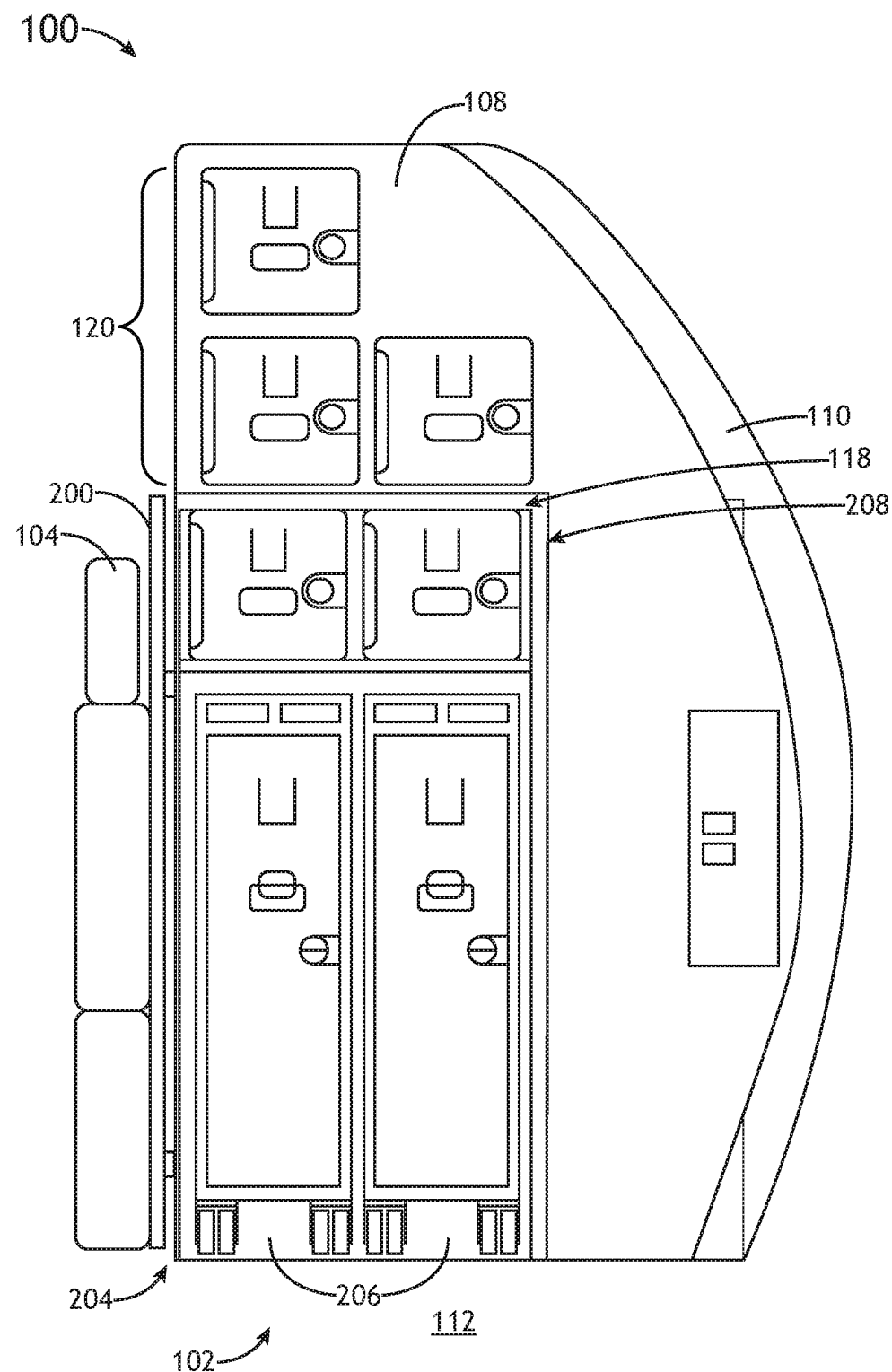
FIG. 2E illustrates an elevation view of an aircraft cabin including a stowable auxiliary compartment panel system, in accordance with one or more embodiments of the disclosure.
Figure 2F:
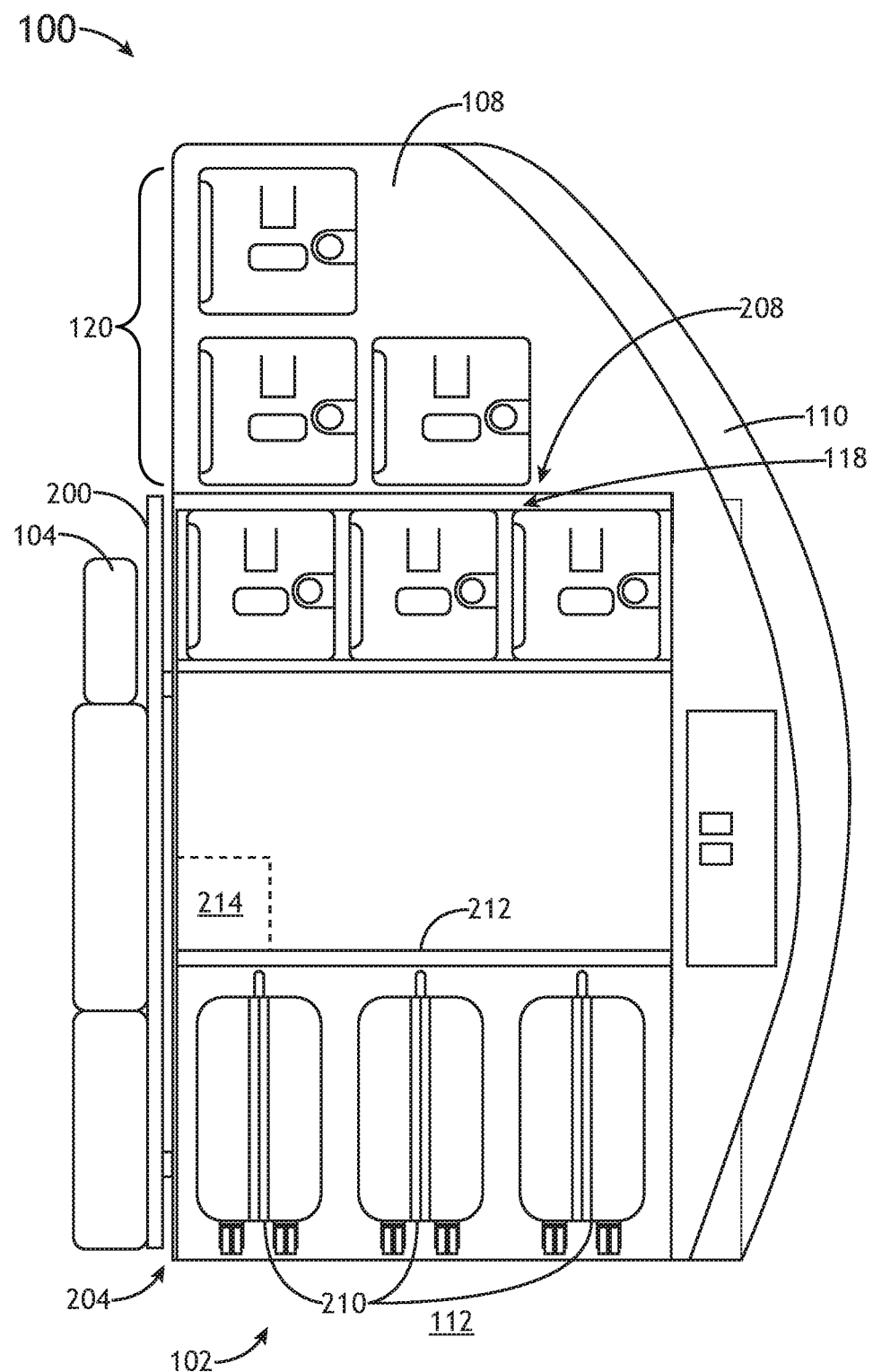
FIG. 2F illustrates an elevation view of an aircraft cabin including a stowable auxiliary compartment panel system, in accordance with one or more embodiments of the disclosure.

Referring now to FIG. 1, the stowable auxiliary compartment panel system 102 may include one or more flight attendant seats 104 (e.g., one or more aircraft seats 104). For example, the stowable auxiliary compartment panel system 102 may include a single flight attendant seat 104 (e.g., as illustrated in FIG. 2B) or multiple flight attendant seats 104 (e.g., as illustrated in at least FIG. 2C). It is noted herein that any embodiments directed to the multiple flight attendant seats 104 may be directed to the single flight attendant seat 104, and vice versa. In addition, it is noted herein that "flight attendant seat" and "aircraft seat" may be considered interchangeable as used throughout the disclosure.

The aircraft cabin 100 may include an aircraft cheek 106. For example, the aircraft cheek 106 may be an auxiliary compartment defined at least in part by a sidewall of a monument 108 and a sidewall of a fuselage 110 including the aircraft cabin 100. By way of another example, the aircraft cheek 106 may be a standalone structure installed within the aircraft cabin 100 proximate to the monument 108 and the sidewall of the fuselage 110.

The one or more flight attendant seats 104 may be deployed within a galley section 112 of the aircraft cabin 100. The galley section 112 may include access to one or more monuments 114 (e.g., one or more lavatories, one or more galleys, one or more stowage spaces, or the like). The galley section 112 may be accessible via an aisle 116.

An auxiliary compartment 118 may be defined within the monument 108. The monument 108 may include space above the auxiliary compartment 118 for one or more galley inserts 120 or stowage compartments.

Referring now to FIGS. 2A-2F, the stowable auxiliary compartment panel system 102 may include an auxiliary compartment panel 200. The one or more flight attendant seats 104 may be coupled to an auxiliary compartment panel 200. The auxiliary compartment panel 200 may cover the auxiliary compartment 118 when the one or more flight attendant seats 104 are in the deployed position.

The stowable auxiliary compartment panel system 102 may include a latch assembly 202. The auxiliary compartment panel 200 may be coupled to the monument 108 via the latch assembly 202 when the one or more flight attendant seats 104 and/or the auxiliary compartment panel 200 are in the deployed position. The latch assembly 202 may be configured to hold the one or more flight attendant seats 104 and/or the auxiliary compartment panel 200 in the deployed position. For example, the latch assembly 202 may be a multi-bolt latch mechanism configured to meet 16G load requirements. In general, the latch assembly 202 may include any mechanism or device with actuators (e.g., such as a handle, a lever, a knob, a button, a toggle, or the like) locking pins (e.g., such as tabs, protrusions, hooks, or the like), cut-outs (e.g., such as a slot, a recess, a notch, a hole, a groove, or the like), threads, or other interlocking components configured to meet aviation guidelines and/or standards.

The latch assembly 202 may be configured to hold the one or more flight attendant seats 104 and/or the auxiliary compartment panel 200 in a stowed position following a transition between the deployed position and the stowed position. It is noted herein, however, that a different latch assembly from the latch assembly 202 may be used to latch the one or more flight attendant seats 104 and/or the auxiliary compartment panel 200 in the stowed position. In addition, it is noted herein the one or more flight attendant seats 104 and/or the auxiliary compartment panel 200 may not be latched down when in the stowed position. Therefore, the above description should not be interpreted as a limitation on the present disclosure but merely an illustration.

The stowable auxiliary compartment panel 102 may include an actuation assembly 204. The one or more flight attendant seats 104 and/or the auxiliary compartment panel 200 may be actuatable via the actuation assembly 204. For example, the actuation assembly 204 may include one or more rails, tracks, sliders, or other components configured to translate the one or more flight attendant seats 104 and/or the auxiliary compartment panel 200. By way of another example, the actuation assembly 204 may include one or more hinges or other components configured to rotate or pivot the one or more flight attendant seats 104 and/or the auxiliary compartment panel 200. By way of another example, the actuation assembly 204 may include a combination of components to both translate and rotate or pivot the one or more flight attendant seats 104 and/or the auxiliary compartment panel 200. For instance, the actuation assembly 204 may be configured to meet 16G load requirements. In general, the actuation assembly 204 may be any mechanism or device configured to meet aviation guidelines and/or standards. It is noted herein that where there are multiple flight attendant seats 104, the multiple flight attendant seats 104 may be actuated as a single unit or independently.

Although embodiments of the disclosure illustrate an auxiliary compartment panel 200 for the one or more flight attendant seats 104, it is noted herein the latch assembly 202 and/or the actuation assembly 204 may be coupled directly to the one or more flight attendant seats 104, such that the auxiliary compartment panel 200 is not necessary (e.g., the one or more flight attendant seats 104 may cover the auxiliary compartment 118). Therefore, the above description should not be interpreted as a limitation on the present disclosure but merely an illustration.

Although embodiments of the disclosure illustrate the one or more flight attendant seats 104 being coupled to the auxiliary compartment panel 200, it is noted herein the auxiliary compartment panel 200 may cover the auxiliary compartment 118 by itself in a no-flight attendant seat 104 build of the stowable auxiliary compartment panel system 102. For example, as illustrated in FIG. 2A, the auxiliary compartment 118 may be covered by a stowable wall in the form of the auxiliary compartment panel 200. It is noted herein the embodiments illustrated in FIG. 2A may be extended to the embodiments illustrated in FIGS. 1A-4E and the processes diagrammed in FIGS. 5-6. It addition, it is noted herein that the description provided within the disclosure may be understood as providing support for the auxiliary compartment panel 200 being stowable without the one or more flight attendant seats 104 being attached to the auxiliary compartment panel 200 (e.g., the stowable auxiliary compartment panel system 102), in addition to providing support for the auxiliary compartment panel 200 being stowable with the one or more flight attendant seats 104 being attached to the auxiliary compartment panel 200 (e.g., a stowable flight attendant seat system). Therefore, the above description should not be interpreted as a limitation on the present disclosure but merely an illustration.

The auxiliary compartment 118 may be accessible from the galley section 112, and not the aisle 116, when the one or more flight attendant seats 104 are in the stowed position. The auxiliary compartment 118 may include one or more crew member (e.g., flight attendant, pilot, co-pilot, or the like) supplies or passenger amenities.

For example, the auxiliary compartment 118 may include stowage for one or more galley carts 206. For instance, the auxiliary compartment 118 may be configured to receive four half-size galley carts 206. In addition, the auxiliary compartment 118 may be configured to receive two full-size galley carts 206.

By way of another example, the auxiliary compartment 118 may include one or more galley inserts 208 (e.g., unit containers, coffeemakers, chillers, ovens, or the like). For instance, the auxiliary compartment 118 may be configured to receive ten food containers.

By way of another example, the auxiliary compartment 118 may include stowage for equipment 210. For instance, the equipment 210 may include emergency equipment, auxiliary aircraft accessories configured to be installed within the aircraft cabin 100 at the request of a passenger (e.g., bassinets, tray tables, or the like), crew member luggage, oversized passenger luggage (e.g., wheelchairs, strollers, car seats, or the like) or other components in need of stowage onboard the aircraft cabin 100.

By way of another example, the auxiliary compartment 118 may include a worktable surface 212. For instance, the worktable surface 212 may be used for food preparation or other crew member uses. In addition, the worktable surface may include a baby-changing surface or other passenger uses.

By way of another example, the auxiliary compartment 118 may include one or more fixtures 214. For instance, the one or more fixtures 214 may include, but are not limited to, one or more plumbing fixtures, one or more light fixtures, one or more power fixtures, or other fixtures usable in a galley, lavatory, or other area in the aircraft cabin 100.

It is noted herein the auxiliary compartment 118 may be configured to include a combination of one or more of the above examples (e.g., be configured to stow one or more galley inserts 208 above one or more galley carts 206, or some other combination). In addition, it is noted herein the auxiliary compartment 118 may be configured for only one of the above examples. Further, it is noted herein the auxiliary compartment 118 may be reconfigurable as needed for multiple of the above examples. Therefore, the above description should not be interpreted as a limitation on the present disclosure but merely an illustration.

Figure 3A:
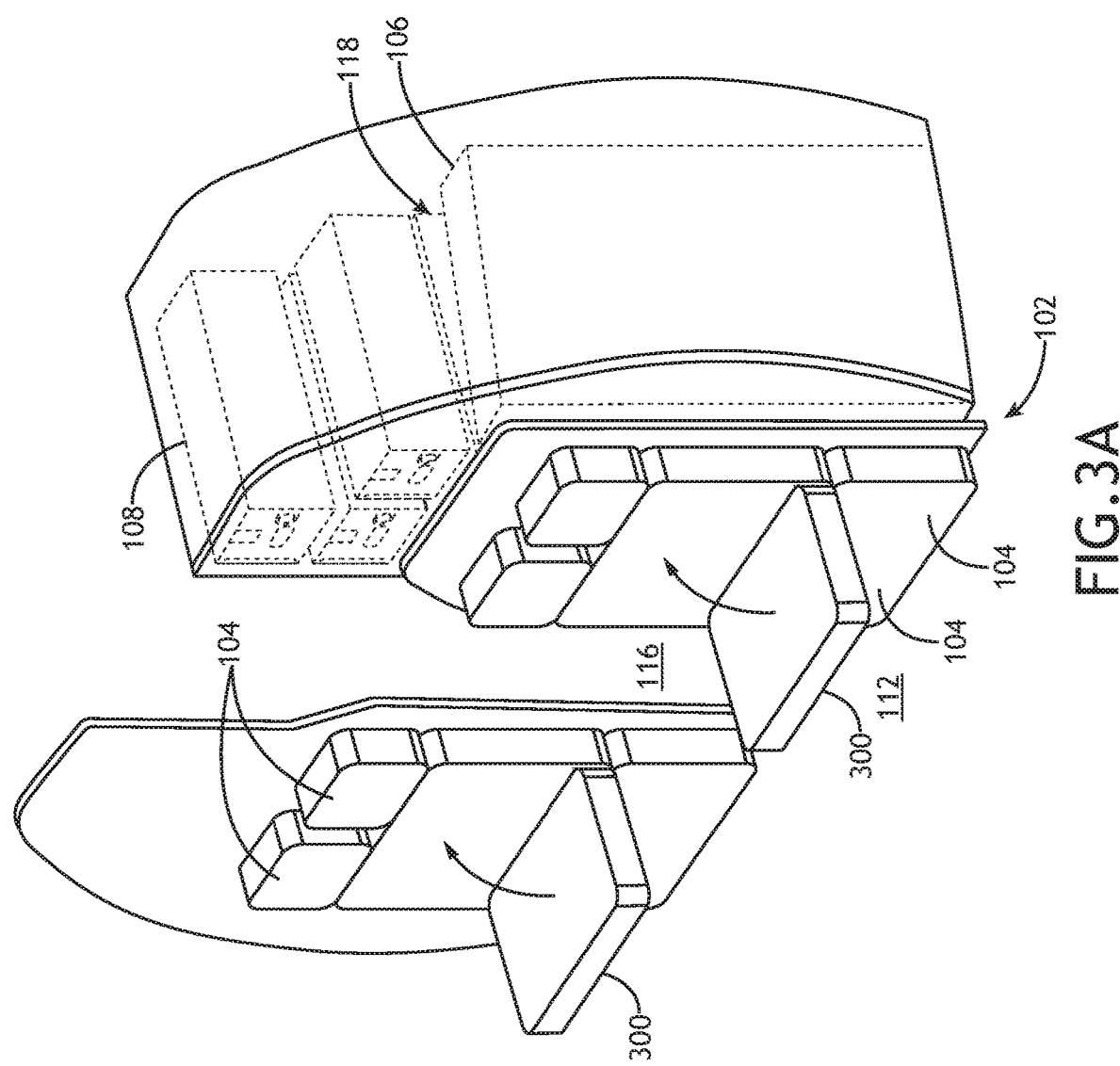
FIG. 3A illustrates a perspective view of an aircraft cabin including a stowable auxiliary compartment panel system, in accordance with one or more embodiments of the disclosure.
Figure 3C:
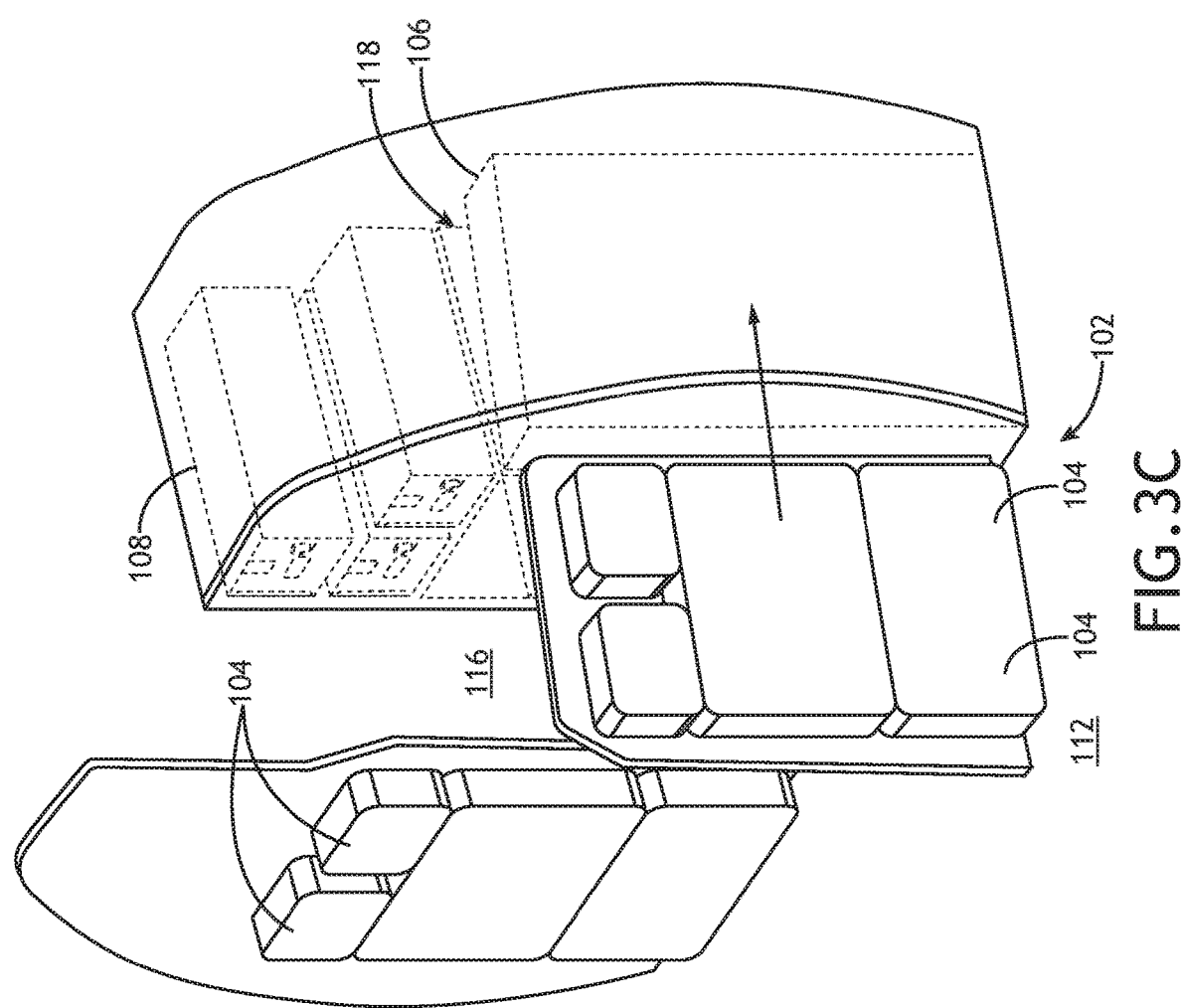
FIG. 3C illustrates a perspective view of an aircraft cabin including a stowable auxiliary compartment panel system, in accordance with one or more embodiments of the disclosure.
Figure 3D:
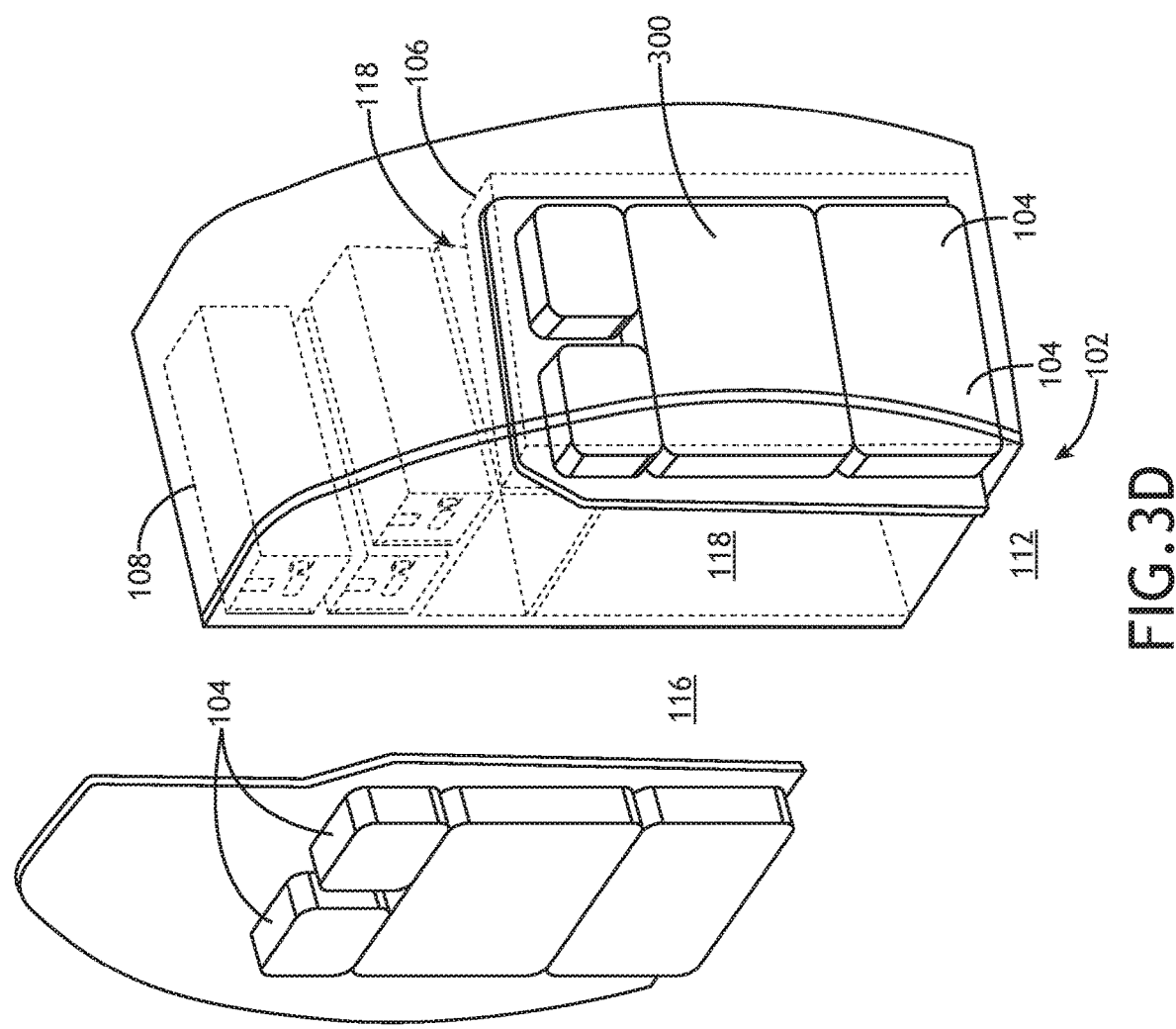
FIG. 3D illustrates a perspective view of an aircraft cabin including a stowable auxiliary compartment panel system, in accordance with one or more embodiments of the disclosure.

Referring now to a transition illustrated in FIGS. 3A-3D, the one or more flight attendant seats 104 and/or the auxiliary compartment panel 200 may be stowable within the aircraft cheek 106. As illustrated in FIG. 3A, a seat pan 300 of the one or more flight attendant seats 104 may be actuated from an open position to a folded position. As illustrated in FIG. 3B, following the disengaging of the latch assembly 202, the one or more flight attendant seats 104 and/or the auxiliary compartment panel 200 may rotate or pivot about a first axis. For example, the one or more flight attendant seats 104 and/or the auxiliary compartment panel 200 may rotate or pivot between 1 and 120 degrees. As illustrated in FIG. 3C, the one or more flight attendant seats 104 and/or the auxiliary compartment panel 200 may then translate along a second axis into the aircraft cheek 106. As illustrated in FIG. 3D, the one or more flight attendant seats 104 and/or the auxiliary compartment panel 200 are stowed within the aircraft cheek 106 so that the auxiliary compartment 118 may be accessed from the galley section 112 (e.g., as opposed to being accessible from the aisle 116).

It is noted herein that the one or more flight attendant seats 104 and/or the auxiliary compartment panel 200 may be configured to transition between the deployed position and the stowed position without interfering with a door bustle 122 (e.g., which may contain an escape slide) within the galley section 112. For example, the actuation assembly 204 may be configured to rotate or pivot the one or more flight attendant seats 104 and/or the auxiliary compartment panel 200 until they are parallel or substantially parallel with the door bustle 122, before the one or more flight attendant seats 104 and/or the auxiliary compartment panel 200 are translated into the aircraft cheek 106 via the actuation assembly 204.

Figure 4A:
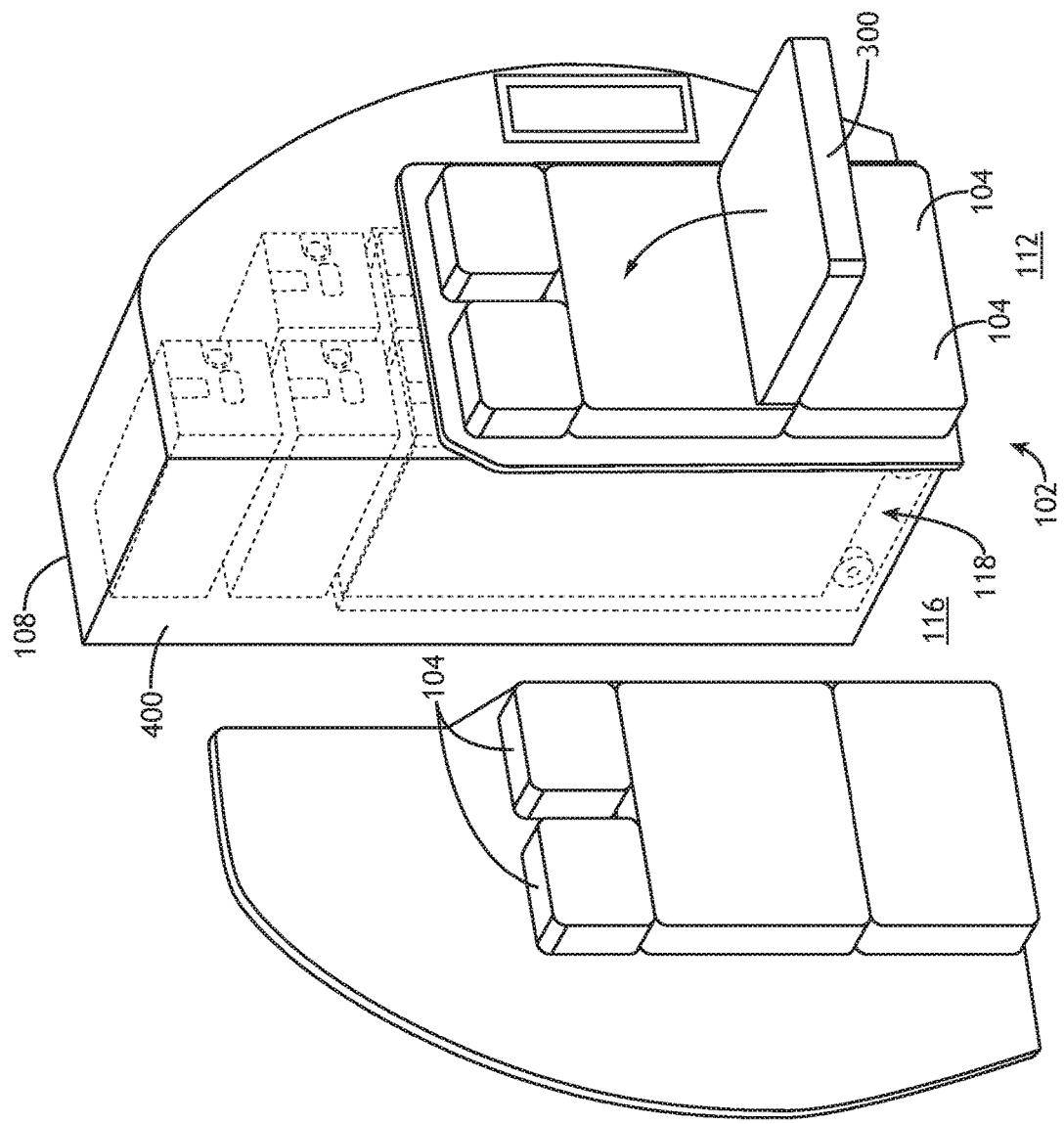
FIG. 4A illustrates a perspective view of an aircraft cabin including a stowable auxiliary compartment panel system, in accordance with one or more embodiments of the disclosure.
Figure 4B:
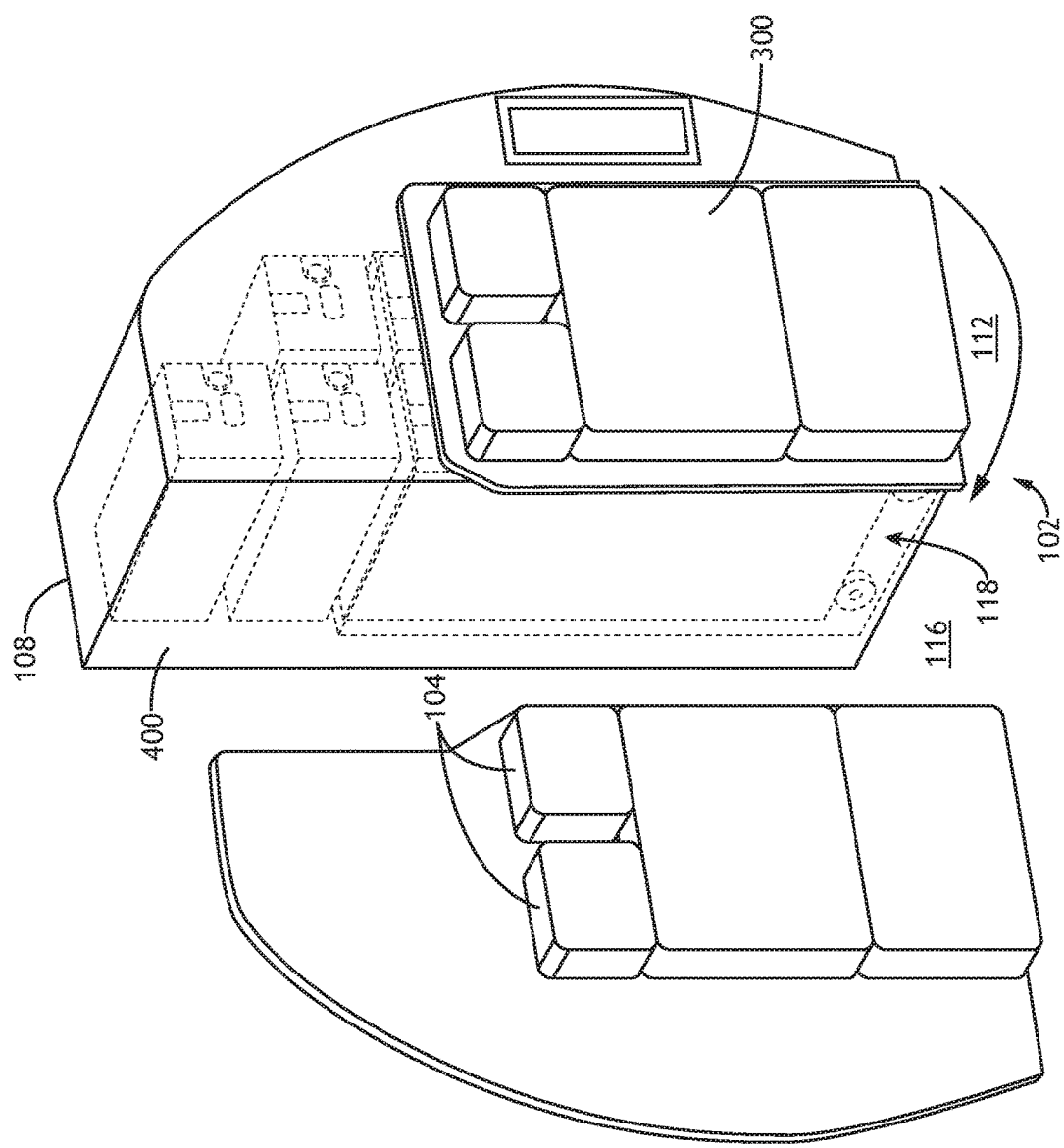
FIG. 4B illustrates a perspective view of an aircraft cabin including a stowable auxiliary compartment panel system, in accordance with one or more embodiments of the disclosure.
Figure 4C:
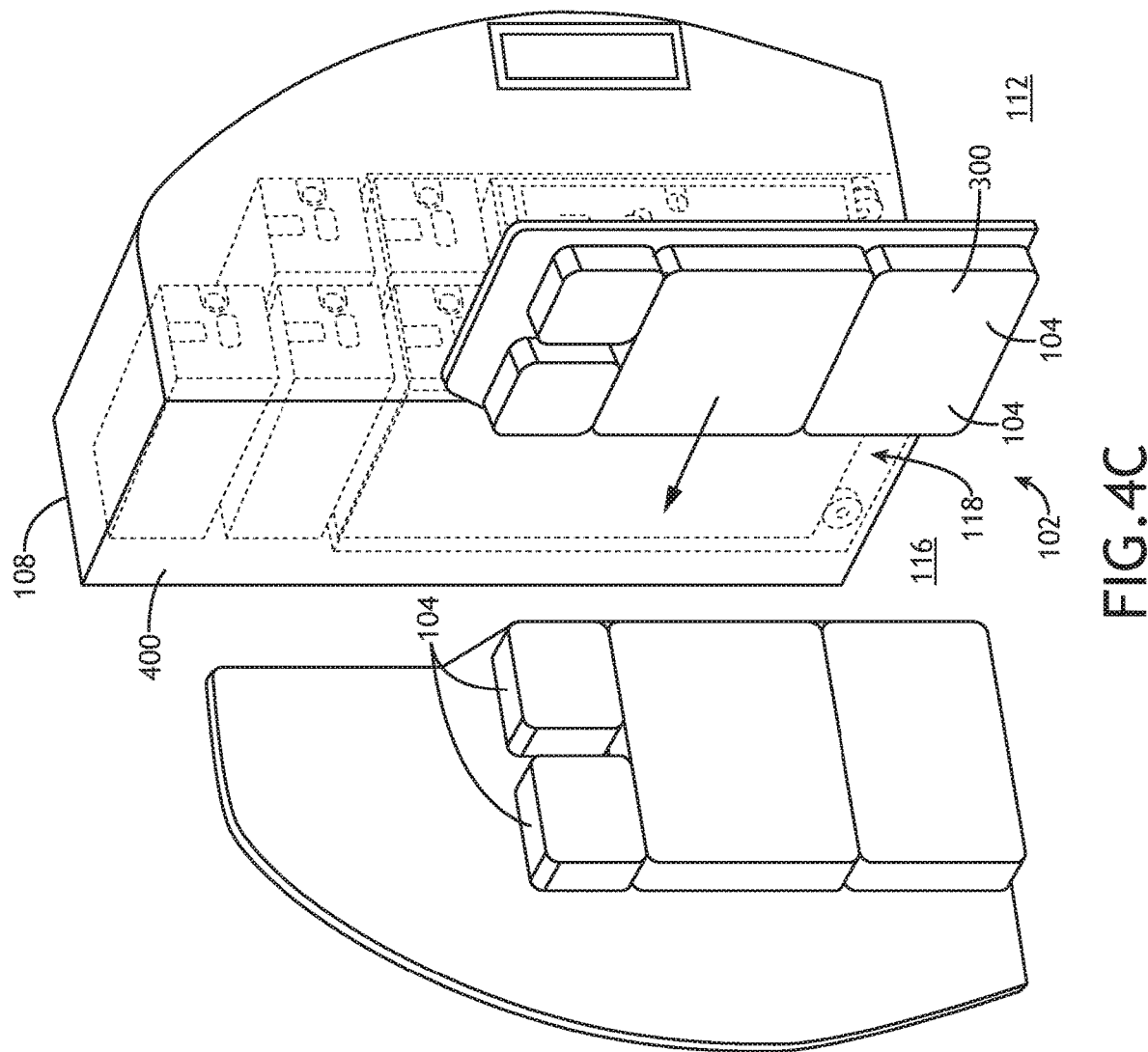
FIG. 4C illustrates a perspective view of an aircraft cabin including a stowable auxiliary compartment panel system, in accordance with one or more embodiments of the disclosure.
Figure 4D:
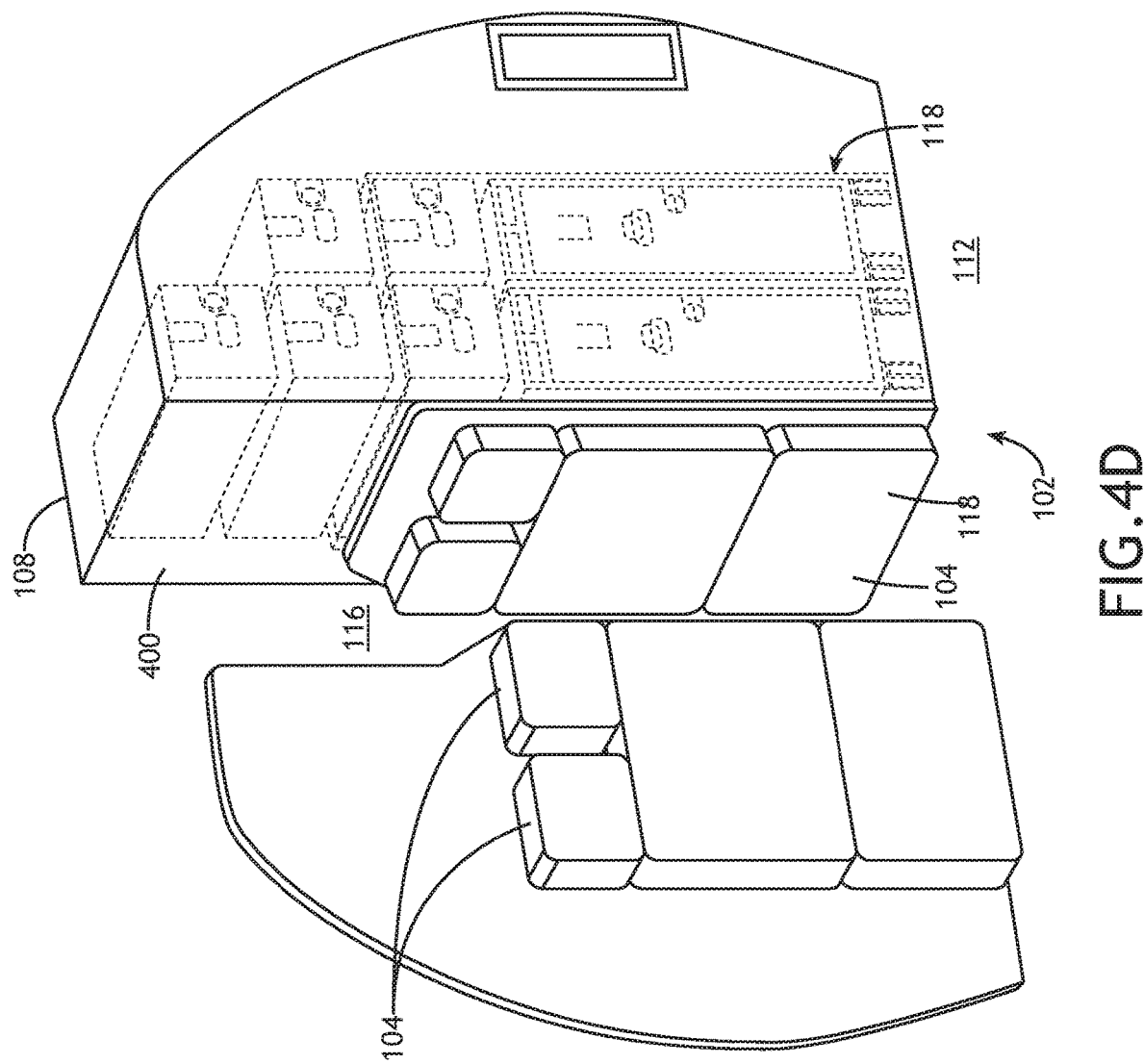
FIG. 4D illustrates a perspective view of an aircraft cabin including a stowable auxiliary compartment panel system, in accordance with one or more embodiments of the disclosure.
Figure 4E:
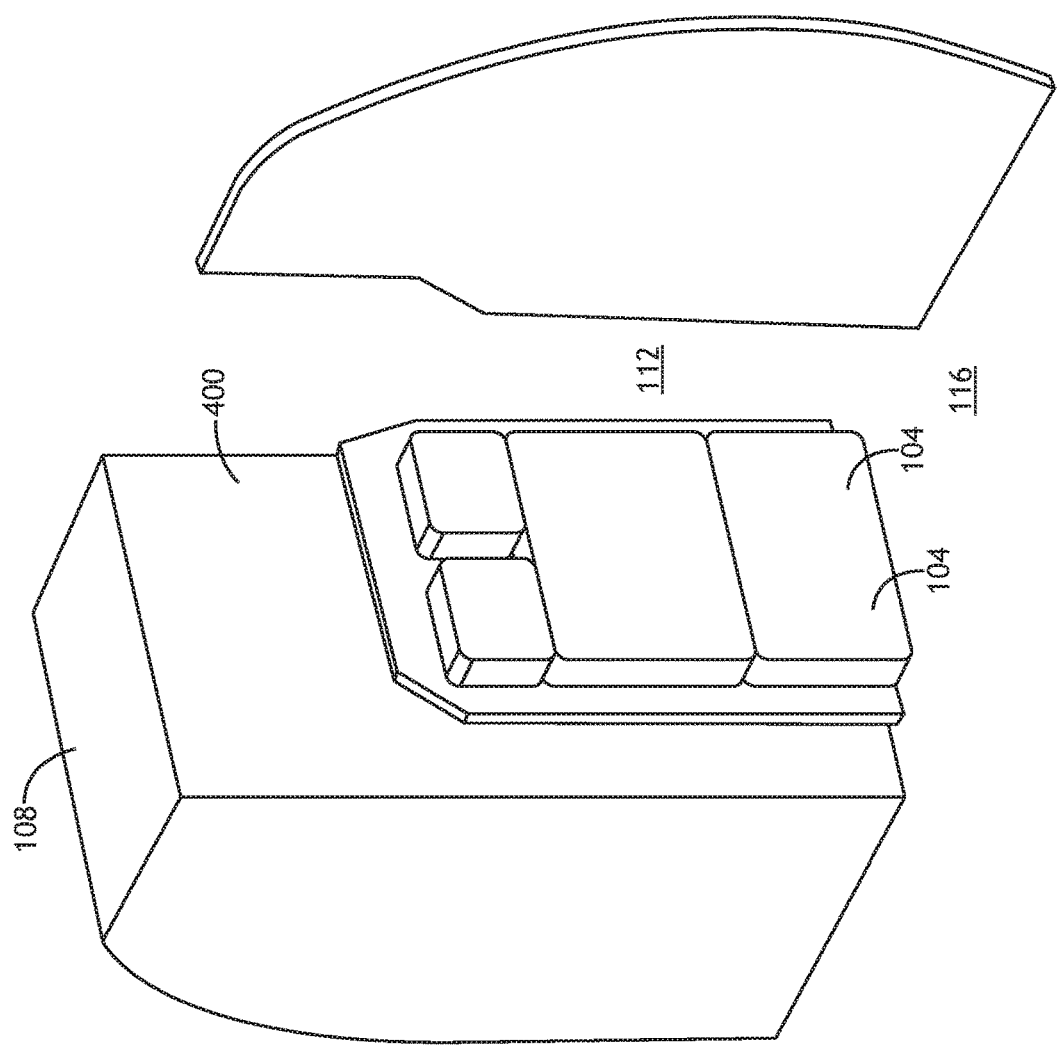
FIG. 4E illustrates a perspective view of an aircraft cabin including a stowable auxiliary compartment panel system, in accordance with one or more embodiments of the disclosure.

Referring now to a transition illustrated in FIGS. 4A-4E, the one or more flight attendant seats 104 and/or the auxiliary compartment panel 200 may be stowable within the aisle 116 proximate to (e.g., alongside, against, or the like) an exterior surface 400 of the monument 108. As illustrated in FIG. 4A, a seat pan 300 of the one or more flight attendant seats 104 may be actuated from an open position to a folded position. As illustrated in FIG. 4B, following the disengaging of the latch assembly 202, the one or more flight attendant seats 104 and/or the auxiliary compartment panel 200 may rotate or pivot about a first axis. For example, the one or more flight attendant seats 104 and/or the auxiliary compartment panel 200 may rotate or pivot between 1 and 120 degrees. As illustrated in FIG. 4C, the one or more flight attendant seats 104 and/or the auxiliary compartment panel 200 may then translate along a second axis proximate to the exterior surface 400 of the monument 108. As illustrated in FIGS. 4D and 4E, the one or more flight attendant seats 104 and/or the auxiliary compartment panel 200 are stowed proximate to the exterior surface 400 of the monument 108 so that the auxiliary compartment 118 may be accessed from the galley section 112 (e.g., as opposed to being accessible from the aisle 116).

It is noted herein that aviation guidelines and/or standards may dictate a minimum aisle 116 width be maintained though the one or more flight attendant seats 104 and/or the auxiliary compartment panel 200 are stowed proximate to the exterior surface 400 of the monument 108.

Although embodiments of the disclosure illustrate the transition of the one or more flight attendant seats 104 and/or the auxiliary compartment panel 200 as including a rotation or pivoting followed by a translation, it is noted herein the rotation and the translation may be tied together (e.g., by a cam follower or other linkage) for a smooth, single-stage transition between the deployed position and the stowed position instead of a multi-stage transition. Therefore, the above description should not be interpreted as a limitation on the present disclosure but merely an illustration.

Figure 5:
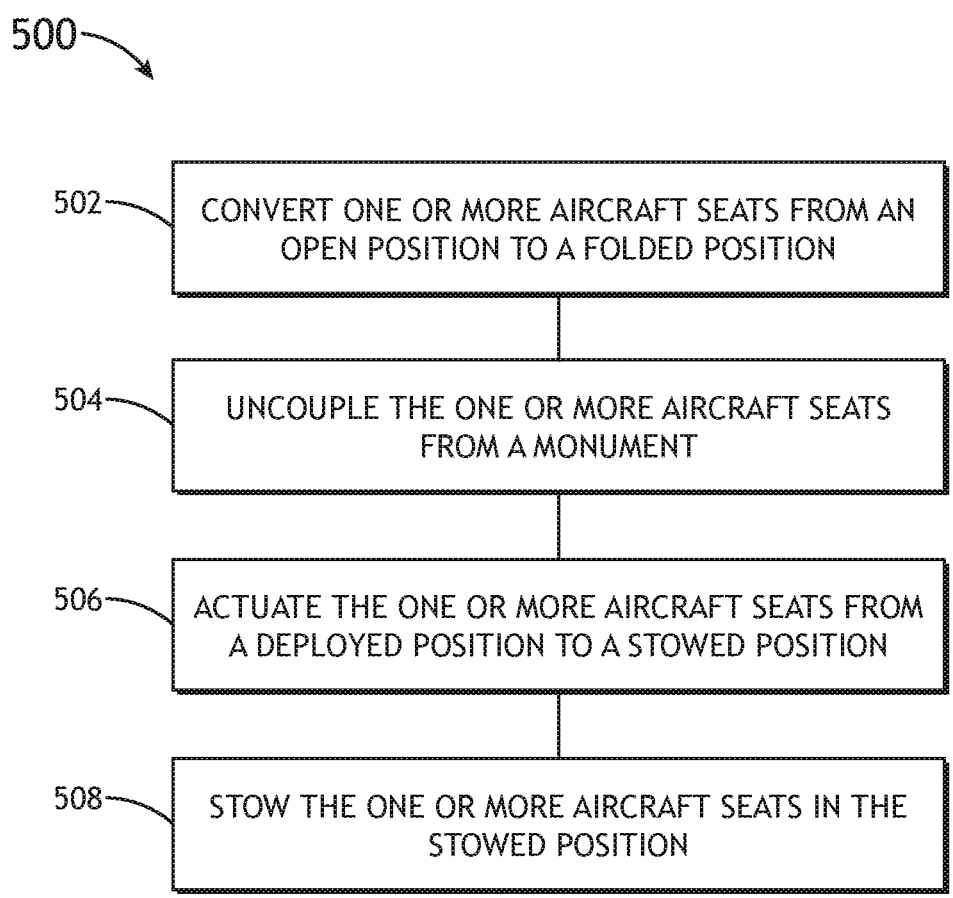
FIG. 5 illustrates a method for stowing a flight attendant seat, in accordance with one or more embodiments of the disclosure.

FIG. 5 illustrates a method or process 500 for stowing flight attendant seats, in accordance with an example embodiment of the disclosure.

In a step 502, one or more aircraft seats are converted from an open position to a folded position. The seat pan 300 of the one or more flight attendant seats 104 of the stowable auxiliary compartment panel system 102 may be actuated into the folded position. Actuating the seat pan 300 may reduce the profile of the one or more flight attendant seats 104 to a mostly-vertical arrangement. It is noted herein the step 502 may be optional where there is no flight attendant seat 104 coupled to the auxiliary compartment panel 200.

In a step 504, the one or more aircraft seats and/or the auxiliary compartment panel are uncoupled from a monument. A latch assembly 202 of the stowable auxiliary compartment panel system 102 may disengage the monument 108 within the aircraft cabin 100, such that the one or more flight attendant seats 104 and/or the auxiliary compartment panel 200 may be freely moveable.

In a step 506, the one or more aircraft seats and/or the auxiliary compartment panel are actuated from a deployed position to a stowed position. The one or more flight attendant seats 104 and/or the auxiliary compartment panel 200 may be actuated via an actuation assembly 204 of the stowable auxiliary compartment panel system 102. The one or more flight attendant seats 104 and/or the auxiliary compartment panel 200 may be rotated or pivoted from the deployed position to an intermediate position. The one or more flight attendant seats 104 and/or the auxiliary compartment panel 200 may be translated from the intermediate position to the stowed position.

In a step 508, the one or more aircraft seats and/or the auxiliary compartment panel are stowed in the stowed position. For example, the stowed position may be within the aircraft cheek 106 of the aircraft cabin 100 including the stowable auxiliary compartment panel system 102. By way of another example, the stowed position may be within the aisle 116 of the aircraft cabin 100 proximate to the exterior surface 400 of the monument 108. Once stowed, the auxiliary compartment 118 of the monument 108 may be accessible via the galley section 112 of the aircraft cabin 100 (e.g., as opposed to the aisle 116).

Figure 6:
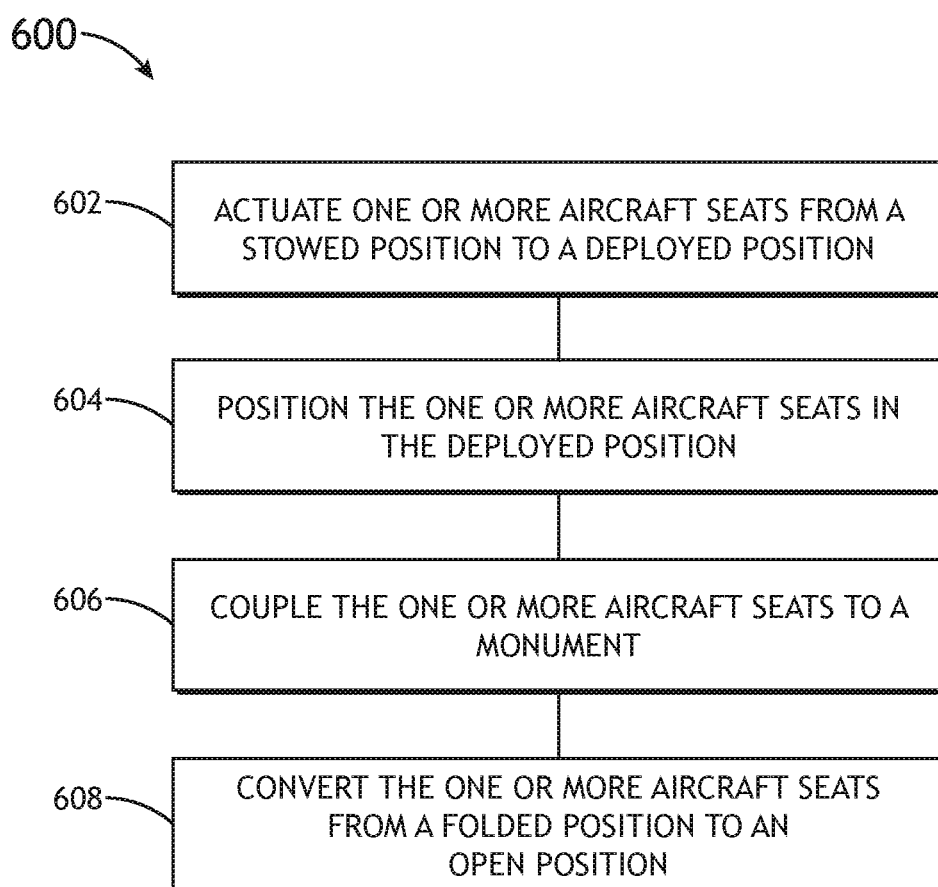
FIG. 6 illustrates a method for deploying a flight attendant seat, in accordance with one or more embodiments of the disclosure.

FIG. 6 illustrates a method or process 600 for stowing flight attendant seats, in accordance with an example embodiment of the disclosure.

In a step 602, one or more aircraft seats and/or the auxiliary compartment panel are actuated from a stowed position to a deployed position. For example, the stowed position may be within the aircraft cheek 106 of the aircraft cabin 100 including the stowable auxiliary compartment panel system 102. By way of another example, the stowed position may be within the aisle 116 of the aircraft cabin 100 proximate to the exterior surface 400 of the monument 108. The one or more flight attendant seats 104 and/or the auxiliary compartment panel 200 may be actuated via the actuation assembly 204 of the stowable auxiliary compartment panel system 102. The one or more flight attendant seats 104 and/or the auxiliary compartment panel 200 may be translated from the stowed position to an intermediate position. The one or more flight attendant seats 104 and/or the auxiliary compartment panel 200 may be rotated or pivoted from the intermediate position to the deployed position.

In a step 604, the one or more aircraft seats and/or the auxiliary compartment panel are positioned in the deployed position. For example, the deployed position may be in front of the auxiliary compartment 118 of the monument 108, such that the auxiliary compartment 118 may not be accessible via the galley section 112 of the aircraft cabin 100.

In a step 606, the one or more aircraft seats and/or the auxiliary compartment panel are coupled to a monument. A latch assembly 202 of the stowable auxiliary compartment panel system 102 may engage the monument 108, such that the one or more flight attendant seats 104 and/or the auxiliary compartment panel 200 may be latched in place.

In a step 608, the one or more aircraft seats are converted from a folded position to an open position. The seat pan 300 of the one or more flight attendant seats 104 of the stowable auxiliary compartment panel system 102 may be actuated into the open position. Actuating the seat pan 300 may allow for flight attendant to have seating (e.g., when an aircraft is in a TTOL situation, turbulence, an emergency, or the like). It is noted herein the step 608 may be optional where there is no flight attendant seat 104 coupled to the auxiliary compartment panel 200.

It is noted herein the methods or processes 500, 600 are not limited to the steps and/or sub-steps provided. The methods or processes 500, 600 may include more or fewer steps and/or sub-steps. The methods or processes 500, 600 may perform the steps and/or sub-steps simultaneously. The methods or processes 500, 600 may perform the steps and/or sub-steps sequentially, including in the order provided or an order other than provided. Therefore, the above description should not be interpreted as a limitation on the scope of the disclosure but merely an illustration.

It is noted herein the stowable auxiliary compartment panel system 102 may be actuated manually (e.g., via a mechanical force provided directly or indirectly to the one or more flight attendant seats 104 and/or the stowable auxiliary compartment panel 200) or electronically. Where the stowable auxiliary compartment panel system 102 is actuated electronically, the aircraft cabin 100 may include a control panel for actuating the stowable auxiliary compartment panel system 102, the control panel being coupled to an aircraft controller.

Although embodiments of the disclosure illustrate the one or more flight attendant seats 104 and/or the stowable auxiliary compartment panel 200 as facing aft when in the deployed position, it is noted herein the stowable auxiliary compartment panel system 102 may be configured to be installed within a fore section of the aircraft cabin 100, such that the one or more flight attendant seats 104 and/or the stowable auxiliary compartment panel 200 may face forward. In general, the stowable auxiliary compartment panel system 102 may be configured to be deployed to face any direction within the aircraft cabin 100. Therefore, the above description should not be interpreted as a limitation on the present disclosure but merely an illustration.

In this regard, the stowable flight attendant seat system 102 may stow a flight attendant seat 104 and/or the stowable auxiliary compartment panel 200 in either an aircraft cheek 106 or proximate to a monument 108 (e.g., within an aisle 112). Stowing the flight attendant seat 104 and/or the stowable auxiliary compartment panel 200 may allow for access to different types of auxiliary spaces including, but not limited to, galleys, stowage spaces, passenger self-serve spaces, or the like without foot traffic congestion in a galley section 112 of the aircraft cabin 100 including the stowable flight attendant seat system 102 and other monuments 114. The flight attendant seat 104 and/or the stowable auxiliary compartment panel 200 may be configured to meet aviation guidelines and/or standards.

It is noted herein the stowable auxiliary compartment panel system 102 may allow for home-base galley provisioning for a multiple-flight scenario. In addition, it is noted herein the stowable auxiliary compartment panel system 102 may allow for increased galley capacity, which may support a higher passenger count and/or a higher level of service. Further, it is noted herein that allowing for access from the galley section 112 may reduce or remove the need for aisle-only access to a monument within the aircraft cabin 100 (e.g., an area potentially with frequent passenger traffic to/from lavatories).

Although embodiments of the disclosure are directed to an avionics environment such as an aircraft cabin 100, it is noted herein the stowable auxiliary compartment panel system 102 is not limited to the avionics environment and/or the aircraft components within the avionics environment. For example, the stowable auxiliary compartment panel system 102 may be configured for any type of vehicle known in the art. For example, the vehicle may be any air, space, land, or water-based personal equipment or vehicle; any air, space, land, or water-based commercial equipment or vehicle; any air, space, land, or water-based military equipment or vehicle known in the art. By way of another example, the stowable auxiliary compartment panel system 102 may be configured for commercial or industrial use in either a home or a business. Therefore, the above description should not be interpreted as a limitation on the present disclosure but merely an illustration.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. An aircraft cabin, comprising:
   a monument mounted between a sidewall of an aircraft fuselage and an aisle, an aircraft cheek defined at least in part by a sidewall of the monument and the sidewall of the aircraft fuselage; and
   a stowable auxiliary compartment panel system positioned proximate to the monument, the stowable auxiliary compartment panel system comprising:
      an auxiliary compartment panel;
      an actuation assembly, the actuation assembly configured to transition the auxiliary compartment panel between a stowed position within the aircraft cheek and a deployed position, the auxiliary compartment panel configured to rotate about a first axis and then translate along a second axis parallel to a door bustle within a galley section of the aircraft cabin when transitioning between the deployed position and the stowed position in the aircraft cheek; and
      a latch assembly, the latch assembly configured to secure the auxiliary compartment panel to the monument when the auxiliary compartment panel is in the deployed position,
   an auxiliary compartment defined within the monument being accessible when the auxiliary compartment panel is in the stowed position.

2. The aircraft cabin of claim 1, further comprising:
   at least one flight attendant seat, the at least one flight attendant seat including a seat pan, the seat pan configured to actuate between a folded position and an open position,
   the at least one flight attendant seat coupled to the auxiliary compartment panel, the seat pan being in the folded position when the auxiliary compartment panel is in the stowed position.

3. The aircraft cabin of claim 1, the auxiliary compartment being accessible from a galley section of the aircraft cabin when the auxiliary compartment panel is in the stowed position.

4. The aircraft cabin of claim 3, the auxiliary compartment configured to stow one or more galley carts.

5. The aircraft cabin of claim 3, the auxiliary compartment including one or more galley inserts.

6. The aircraft cabin of claim 3, the auxiliary compartment configured to stow equipment including emergency equipment, auxiliary aircraft accessories, crew member luggage, or oversized passenger luggage.

7. The aircraft cabin of claim 3, the auxiliary compartment including a worktable area.

8. The aircraft cabin of claim 3, the auxiliary compartment including one or more fixtures.

9. An aircraft cabin, comprising:
   a monument mounted between a sidewall of an aircraft fuselage and an aisle;
   a second monument adjacent to the monument, the aisle defined by an exterior surface of the monument and the second monument;
   a stowable auxiliary compartment panel system positioned proximate to the monument, the stowable auxiliary compartment panel system comprising:
      an auxiliary compartment panel;
      an actuation assembly, the actuation assembly configured to transition the auxiliary compartment panel between a stowed position and a deployed position, the auxiliary compartment panel proximate to the exterior surface of the monument within the aisle in the stowed position, the auxiliary compartment panel configured to rotate about a first axis and then translate along a second axis parallel to the exterior surface of the monument when transitioning between the deployed position and the stowed position; and
      a latch assembly, the latch assembly configured to secure the auxiliary compartment panel to the monument when the auxiliary compartment panel is in the deployed position, and
   a flight attendant seat coupled to the second monument, the flight attendant seat including a seat pan, the seat pan configured to actuate between a folded position and an open position;
   an auxiliary compartment defined within the monument being accessible when the auxiliary compartment panel is in the stowed position.

10. The aircraft cabin of claim 9, further comprising at least one additional flight attendant seat, the at least one additional flight attendant seat including an additional seat pan, the additional seat pan configured to actuate between a folded position and an open position.

11. The aircraft cabin of claim 9, the auxiliary compartment being accessible from a galley section of the aircraft cabin when the auxiliary compartment panel is in the stowed position.

* * * * *